US011636583B2

(12) United States Patent
Yang et al.

(10) Patent No.: US 11,636,583 B2
(45) Date of Patent: *Apr. 25, 2023

(54) METHOD AND SYSTEM FOR VISION-BASED DEFECT DETECTION

(71) Applicant: Wistron Corp., New Taipei (TW)

(72) Inventors: Jie-Ci Yang, New Taipei (TW); Meng-Chao Kao, New Taipei (TW); Wen-Kuong Liu, New Taipei (TW); Tsang-Hsing Lee, New Taipei (TW); Li-Ping Pan, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/328,775

(22) Filed: May 24, 2021

(65) Prior Publication Data
US 2021/0302224 A1 Sep. 30, 2021

Related U.S. Application Data

(63) Continuation of application No. 17/088,591, filed on Nov. 4, 2020, now Pat. No. 11,326,935, which is a (Continued)

(30) Foreign Application Priority Data

Oct. 21, 2019 (TW) .................................. 108137945

(51) Int. Cl.
G01H 9/00 (2006.01)
G06N 20/10 (2019.01)
(Continued)

(52) U.S. Cl.
CPC ............. *G06T 7/0004* (2013.01); *G01H 9/00* (2013.01); *G06F 18/2411* (2023.01);
(Continued)

(58) Field of Classification Search
CPC .... H04R 29/001; H04R 29/008; H04R 29/00; H04R 29/003; H04R 1/1015;
(Continued)

(56) References Cited

U.S. PATENT DOCUMENTS 10,863,294 B1 * 12/2020 Yang ..................... H04R 29/008
11,326,935 B2 * 5/2022 Yang ..................... G06T 7/0004
(Continued)

FOREIGN PATENT DOCUMENTS

CN 104130498 11/2014
CN 205812392 12/2016
(Continued)

OTHER PUBLICATIONS

English machine translation of ES-2385393-A1 (Sala, Loudspeaker diagnostic equipment and procedure for using these through the use of transformed wavelet, published Jul. 2012) (Year: 2012).*
(Continued)

*Primary Examiner* — Mark Fischer
(74) *Attorney, Agent, or Firm* — McClure, Qualey & Rodack, LLP

(57) ABSTRACT

A method and a system for vision-based defect detection are proposed. The method includes the following steps. A test audio signal is outputted to a device-under-test (DUT), and a response signal of the DUT with respect to the test audio signal is received to generate a received audio signal. Signal processing is performed on the received audio signal to generate a spectrogram, and whether the DUT has an unacceptable defect with respect to the predefined auditory standard is determined by analyzing a distribution of signal strength according to the spectrogram.

17 Claims, 13 Drawing Sheets

Related U.S. Application Data continuation-in-part of application No. 16/706,817, filed on Dec. 8, 2019, now Pat. No. 10,863,294.

(51) Int. Cl.
  *G06K 9/62* (2022.01)
  *G06T 7/00* (2017.01)
  *G06F 18/2411* (2023.01)
  *G06V 10/764* (2022.01)
  *G06V 10/50* (2022.01)

(52) U.S. Cl.
  CPC .............. *G06N 20/10* (2019.01); *G06V 10/50* (2022.01); *G06V 10/764* (2022.01)

(58) Field of Classification Search
  CPC .............. G06T 7/0002; G06T 7/40; G06T 2207/20016; G06T 2207/20021; G06T 2207/20081; G10L 21/14; G10L 21/18; G07C 3/00; G07C 3/005; G07C 3/14; G07C 3/143; G07C 3/146; G05B 19/41875; H03M 1/1085
  See application file for complete search history.

(56) References Cited

U.S. PATENT DOCUMENTS

| | | | | |
|---|---|---|---|---|
| 2003/0187636 A1* | 10/2003 | Klippel | ................ | H04R 29/001 |
| | | | | 704/220 |
| 2014/0074435 A1* | 3/2014 | Cohn | ..................... | H04R 29/00 |
| | | | | 702/184 |
| 2015/0256944 A1* | 9/2015 | Inagaki | .................. | G01H 17/00 |
| | | | | 381/60 |
| 2016/0247533 A1 | 8/2016 | Tanaka | | |
| 2017/0289717 A1 | 10/2017 | Little | | |

FOREIGN PATENT DOCUMENTS

| | | | | |
|---|---|---|---|---|
| CN | 109040940 | 12/2018 | | |
| ES | 2385393 A1 * | 7/2012 | .......... | H03M 1/1085 |
| TW | I587294 | 6/2017 | | |

OTHER PUBLICATIONS

Wikipedia, Computer Vision, https://web.archive.org/web/20191017223447/https://en.wikipedia.org/wiki/Computer_vision, published Oct. 17, 2019 (Year: 2019).*
Wikipedia, Spectrogram, https://web.archive.org/web/20190928114729/https://en.wikipedia.org/wiki/Spectrogram, published Sep. 2019 (Year: 2019).*
India Office Action dated Jun. 22, 2021, in a related India application No. 202014013186.

* cited by examiner

METHOD AND SYSTEM FOR VISION-BASED DEFECT DETECTION

CROSS-REFERENCE TO RELATED APPLICATION

This application is a continuation application of U.S. application Ser. No. 17/088,591, filed on Nov. 4, 2020, which is a continuation-in-part application of and claims the priority benefit of U.S. application Ser. No. 16/706,817, filed on Dec. 8, 2019, now allowed. The prior U.S. application Ser. No. 16/706,817 is based on and claims the priority benefit of Taiwan application serial no. 108137945, filed on Oct. 21, 2019. The entirety of each of the above-mentioned patent applications is hereby incorporated by reference herein and made a part of this specification.

TECHNICAL FIELD

The disclosure relates to a detection technique, and more particularly, to a method and a system for vision-based defect detection.

BACKGROUND

A speaker is a transducer that converts electrical signals to audio signals widely used in devices including audio electronics, earphones and the like, and its performance affects the use of these devices. Traditionally, rub and buzz of the speaker are detected by experienced listeners at the end of the production line. This type of detection requires a log-swept sine chirps to be applied to the speaker and uses human auditory detection to analyze whether a response signal is normal. However, such a result detected by the human ear may vary with the subjective factors such as the age, mood change, and hearing fatigue of the listener, and is likely to cause occupational injury to the listener.

SUMMARY

The disclosure provides a method and a system for vision-based defect detection, which can detect whether a device-under-test (DUT) has an unacceptable defect with respect to a predefined auditory standard through computer vision from a spectrogram.

In an embodiment of the disclosure, the method includes the following steps. A test audio signal is outputted to the DUT, and a response signal of the DUT with respect to the test audio signal is received to generate a received audio signal. Signal processing is performed on the received audio signal to generate the spectrogram and whether the DUT has an unacceptable defect with respect to a predefined auditory standard is determined through computer vision according to the spectrogram.

In an embodiment of the disclosure, the system includes a signal outputting device, a microphone, an analog-to-digital converter and a processing device. The signal outputting device is configured to output a test audio signal to the DUT. The microphone is configured to receive a response signal of the DUT with respect to the test audio signal. The analog-to-digital converter is configured to convert the response signal to a received audio signal. The processing device is configured to perform signal processing on the received audio signal to generate a spectrogram and determine whether the DUT has an unacceptable defect with respect to a predefined auditory standard through computer vision according to the spectrogram.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
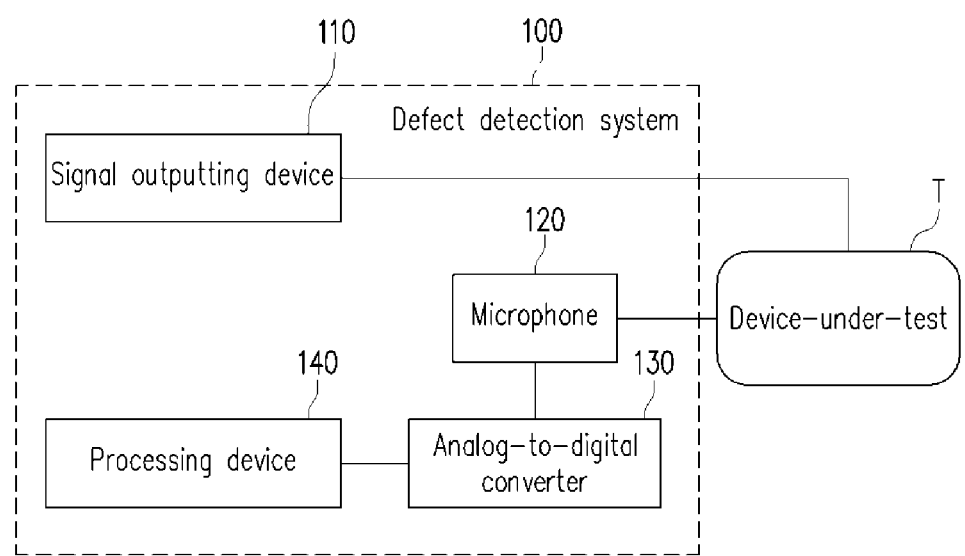
FIG. 1 is a block diagram illustrating a defect detection system according to an embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

Some embodiments of the disclosure are described in details below by reference with the accompanying drawings, and as for reference numbers cited in the following description, the same reference numbers in difference drawings are referring to the same or like parts. The embodiments are merely a part of the disclosure rather than disclosing all possible embodiments of the disclosure. More specifically, these embodiments are simply examples of the method and the system recited in claims of the disclosure.

FIG. 1 is a block diagram illustrating a defect detection system according to an embodiment of the disclosure. It should, however, be noted that this is merely an illustrative example and the disclosure is not limited in this regard. All components of the defect detection system and their configurations are first introduced in FIG. 1. The functionalities of the components are disclosed in more detail in conjunction with FIG. 2.

Referring to FIG. 1, a defect detection system 100 includes a signal outputting device 110, a microphone 120, an analog-to-digital converter 130 and a processing device 140, which is configured to detect whether a device-under-test (DUT) T has a defect.

The signal outputting device 110 is configured to output a test audio signal to the DUT T, which may be, for example, an electronic device having a digital audio outputting interface. The test audio signal is outputted to the DUT T in wireless or wired manner. The microphone 120 is configured to receive a response of the DUT T with respect to the test audio signal, and may be disposed in the vicinity of the DUT T or at a best receiving position with respect to the DUT T. The analog-to-digital converter 130 is connected to the microphone 120, and is configured to convert an analog sound received by the microphone 120 to a digital sound signal.

The processing device 140 is connected to the analog-to-digital converter 130, and is configured to process the digital sound signal received from the analog-to-digital converter 130 so as to detect whether the DUT T has a defect. The processing device 140 includes a memory and a processor. The memory may be, for example, a fixed or movable device in any possible forms, including a random access memory (RAM), a read-only memory (ROM), a flash memory, a hard drive or other similar devices, integrated circuits or a combination of the above-mentioned devices. The processor may be, for example, a central processing unit (CPU), an application processor (AP) or other programmable microprocessors for general purpose or special purpose, a digital signal processor (DSP), or other similar devices, integrated circuits and a combination of the above.

It should be noted that in an embodiment, the signal outputting device 110, the microphone 120, the analogue-to-digital converter 130 and the processing device 140 may respectively belong to four separate devices. In an embodiment, the signal outputting device 110 and the processing device 140 may be integrated into the same device, and the processing device 140 can control outputting of the signal outputting device 110. In an embodiment, the signal outputting device 110, the microphone 120, the analog-to-digital converter 130 and the processing device 140 may also be an all-in-one computer system. The disclosure does not impose any limitation on integration of the signal output device 110, the microphone 120, the analog-to-digital converter 130 and the processing device 140. Any systems including such devices are within the scope of defect detection system 100.

Embodiments are provided below to describe detailed steps in a defect detection method used by the defect detection system 100 for the DUT T. The following embodiment is described by using an electronic device having a speaker as an example of the DUT T, and the defect to be detected by the defect detection system 100 is rub and buzz of the DUT T.

Figure 2:
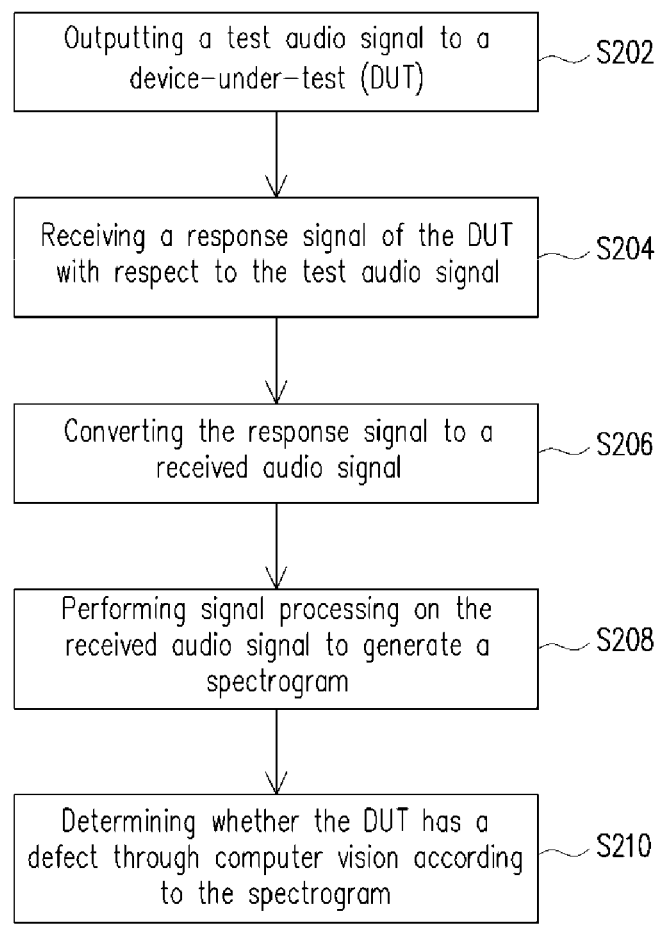
FIG. 2 is a flowchart illustrating a method for vision-based defect detection according to an embodiment of the disclosure.

FIG. 2 is a flowchart illustrating a method for vision-based defect detection according to an embodiment of the disclosure, and the flow of FIG. 2 is performed by the defect detection system 100 of FIG. 1.

Referring to FIG. 1 and FIG. 2 together, the signal outputting device 110 outputs the test audio signal to the DUT T (step S202), the microphone 120 receives a response signal of the DUT T with respect to the test audio signal (step S204), and the analog-to-digital converter 130 converts the response signal to a received audio signal (step S206). Here, an audio range of the test audio signal may be 1K to 20 Hz, in which an amplitude of 1K to 500 Hz is −25 dB, an amplitude of 500 Hz to 300 Hz is −15 dB and an amplitude of 300 Hz to 20 Hz is −8 dB. However, since the rub and buzz will generate a resonance with a specific frequency point of the test audio signal, in order to prevent a resonance not belonging to the rub and buzz (e.g., a button resonance) from affecting the detection of the rub and buzz, the audio range and the amplitude of the test audio signal are adjusted according to the DUT T. The DUT T will generate the response signal with respect to the test audio signal, and the microphone 120 will receive the response signal from the DUT T. Next, the analog-to-digital converter 130 performs analog-to-digital conversion on the analog response signal to a digital response signal (hereinafter referred to as "a received audio signal").

The processing device 140 performs signal processing on the received audio signal to generate a spectrogram (step S208), and determines whether the DUT T has the defect through computer vision according to the spectrogram (step S210). The processing device 140 may perform Fast Fourier Transform (FFT) on the received audio signal to generate the spectrogram. Here, the reason why the received audio signal is converted to the spectrogram is that the rub and buzz does not have a significant feature in the received audio signal, and yet the rub and buzz can have a time continuity when having a resonance with the received audio signal. Therefore, if a time domain signal is converted to the spectrogram, the feature of the rub and buzz will exhibit time-continuous and energy clustering in the spectrogram, which can used to achieve the defect detection on the DUT through computer vision.

Figure 3:
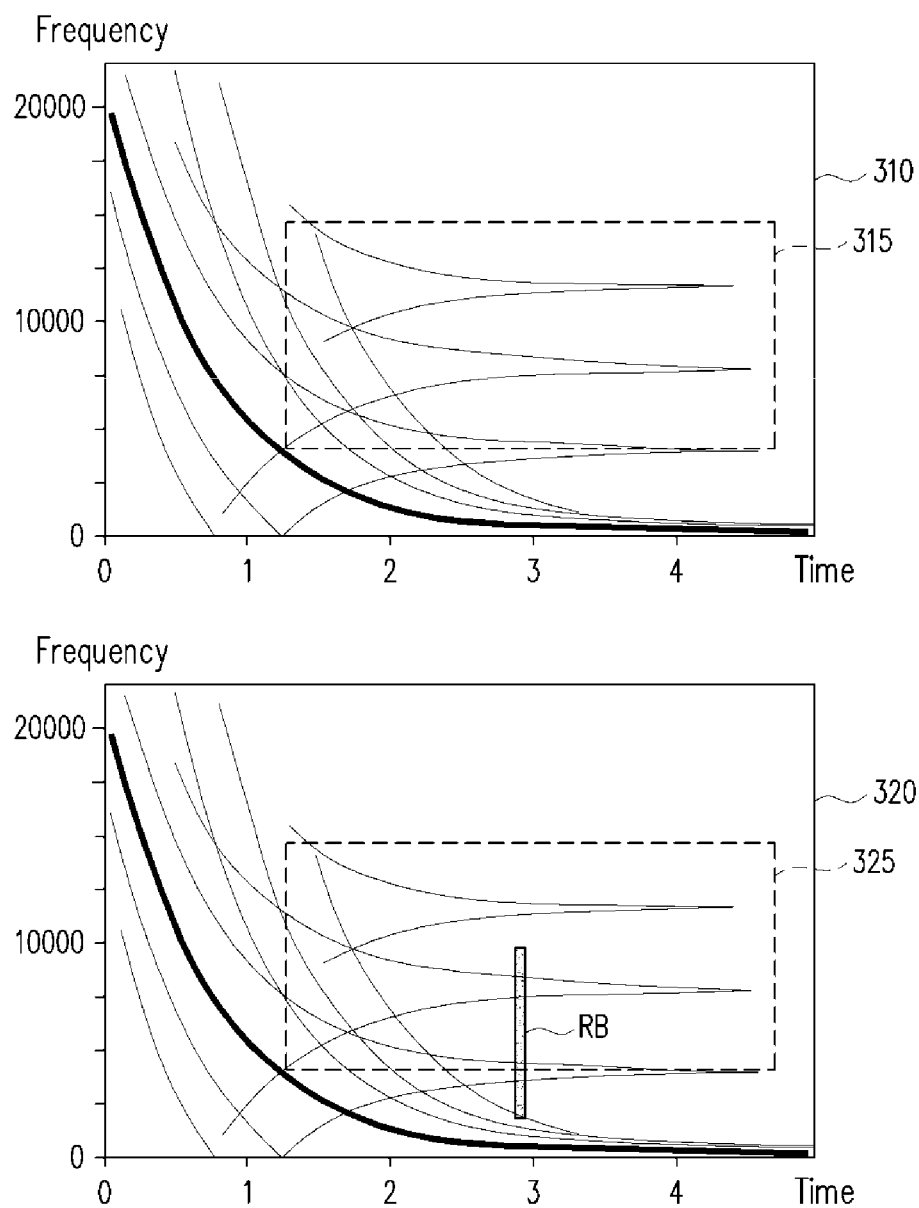
FIG. 3 is a schematic diagram illustrating a spectrogram according an embodiment of the disclosure.

In an example of FIG. 3, which is a schematic diagram illustrating a spectrogram according an embodiment of the disclosure, a spectrogram 310 corresponds to a sound signal without the rub and buzz, and a spectrogram 320 corresponds to a sound signal with the rub and buzz. It should be noted that those skilled in the art should understand that the spectrogram represents a distribution of signal strength over time and frequency, and the spectrogram 310 and the spectrogram 320 simply show significant signal strengths by curves. Here, the sound signal with the rub and buzz has the feature of time-continuous and energy clustering in the spectrogram 320 (i.e., rub and buzz RB). Therefore, if the processing device 140 is used to analyze the spectrogram through computer vision, whether the DUT T has the rub and buzz due to an assembly detect can then be detected.

In the following embodiment, a classifier is used to perform image recognition. Accordingly, before the processing device 140 detects whether the DUT T has the defect, a trained classifier will be obtained. Here, the classifier may be trained by the processing device 140 itself, or may be a classifier trained by other processing devices, which are not particularly limited in the disclosure.

Figure 4:
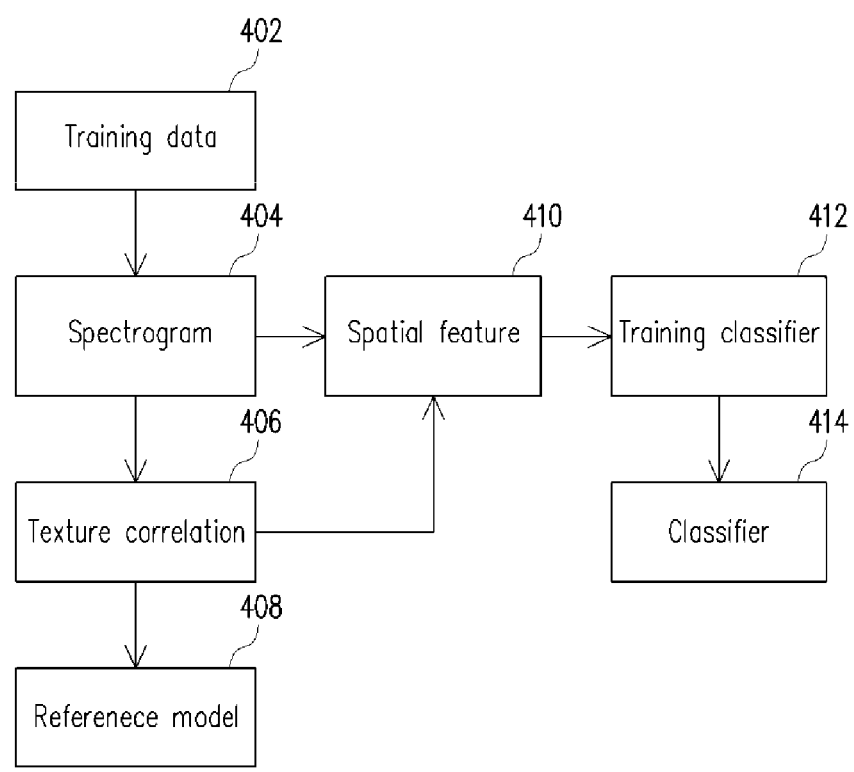
FIG. 4 is a functional block diagram illustrating a construction of a classifier according to an embodiment of the disclosure.

FIG. 4 is a functional block diagram illustrating a construction of a classifier according to an embodiment of the disclosure. In the following embodiment, the construction of the classifier is performed by a device similar to the processing device 140 (hereinafter referred to as "a training system").

Referring to FIG. 4, first of all, the training system collects a plurality of training data 402. Here, the training data may be N1 non-defective training sound samples and N2 defective training sound samples respectively generated from N1 non-defective training objects and N2 defective training objects in a manner similar to steps S202 to S204.

Here, the N1+N2 training objects and the DUT T are of a same object but have passed the defect detection in advance.

Then, the training system converts the training data to a spectrogram 404. In order to reduce the computational complexity and to avoid low frequency noise and high frequency noise images, the training system selects a preset frequency range of, for example, 3K to 15K Hz as an inspection region. In the example of FIG. 3, a region 315 is an inspection region of the spectrogram 310, and a region 325 is an inspection region of the spectrogram 320. For descriptive convenience, hereinafter, the inspection regions in the spectrogram corresponding to the non-defective training sound samples are referred to as "non-defective inspection region images", and the inspection regions in the spectrogram corresponding to the defective training sound samples are referred to as "defective inspection region images".

Then, the training system obtains feature values corresponding to the different regions in each of the defective inspection region images and each of the non-defective inspection region images, and obtains texture correlation 406 of each of the defective inspection region images and each of the non-defective inspection region images with respect to a reference model 408 as a spatial feature 410 to train a training classifier 412 and thereby generate a classifier 414 for detecting whether the DUT T has the defect.

Here, the training system performs image segmentation on all of the defective inspection region images and the non-defective inspection region images to generate a plurality of sub-blocks of a same size (e.g., a pixel size of 40×200). In this embodiment, if the size of the sub-block is too large, a proportion of the feature of the rub and buzz will be reduced; and if the size of the sub-block is too small, the feature of the rub and buzz will not be covered and a subsequent recognition result will be affected. Therefore, the training system may obtain the spatial feature of each of the defective inspection region images and the non-defective inspection region images according to FIG. 5, which is a functional block diagram illustrating a method for obtaining a spatial feature according to an embodiment of the disclosure.

Figure 5:
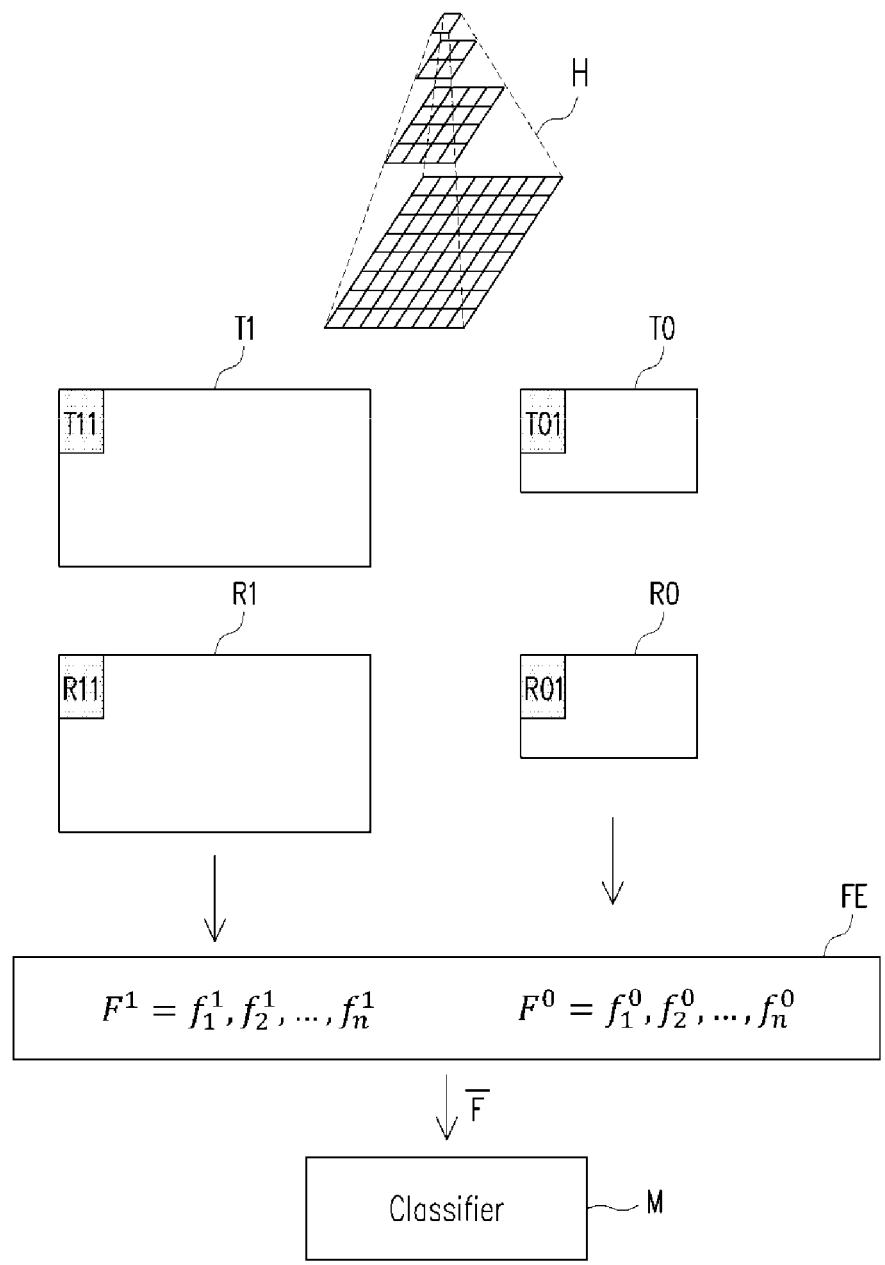
FIG. 5 is a functional block diagram illustrating a method for obtaining a spatial feature according to an embodiment of the disclosure.

Referring to FIG. 5, the training system performs image pyramid processing H on each of the defective inspection region images and the non-defective inspection region images to generate images with different scales. In this embodiment, there are two scales, which are an original image size and ¼ of the original image size (a length and a width of an original image are reduced to ½ of the original image respectively). Here, the flow of FIG. 5 is described by using one of the defective inspection region images, and those skilled in the art can analogize a processing manner for the rest of the defective inspection region images and the non-defective inspection region images. It is assumed that T1 is one of the defective inspection region images having a pixel size of 1000×800. T11 is one of the sub-blocks after image segmentation (hereinafter referred to as "a training sub-block") having a pixel size of 40×200. On the other hand, T0 is an image having a pixel size of 500×400 generated by performing image pyramid processing (reduction processing) on T1. T01 is one of the training sub-blocks after image segmentation having a pixel size the same as the training sub-block T11, i.e., the pixel size of 40×200.

Next, the training system performs a feature extraction FE on each of the training sub-blocks segmented from each of the non-defective inspection region images and the defective inspection region images with different scales. In this embodiment, the training system can compute at least one of a standard deviation σ and a Kurtosis of pixel values of each of the training sub-blocks k as the feature value of each of the training sub-blocks, but the disclosure is not limited thereto. In addition, in order to improve differentiation between non-defective and defective, the training system can generate a reference model associated with non-defective according to the N1 non-defective inspection region images. For instance, the training system can obtain the reference model by averaging the pixel values of the N1 non-defective inspection region images of the same scale. In this way, each scale can have its own corresponding reference model. In this embodiment, the training system generates a reference model R1 corresponding to the image T1 and a reference model R0 corresponding to the image T0. Here, because the reference model R1 and the image T1 have the same scale, the training sub-block in the image T1 can locate the corresponding sub-block (hereinafter referred to as "a reference sub-block") in the reference model R1. Similarly, because T0 and the reference model R0 have the same scale, the training sub-block in the image T0 can locate the corresponding reference sub-block in the reference model R0.

Next, the training system computes the texture correlation between each of the sub-blocks of each scale and the reference sub-blocks in the corresponding reference model. Specifically, the training system computes the texture correlation between the training sub-block T11 and the reference sub-block R11 and computes the texture correlation between the training sub-block T01 and the reference sub-block R01. Here, the texture correlation may be a correlation coefficient coeff of a local binary pattern (LBP) between the sub-block and the reference sub-block.

Here, each sub-block has a feature vector f={σ, k, coeff} of its own, and each image has an image feature vector $F=\{f_1, f_2, \ldots, f_n\}$ of its own, wherein n is the number of the sub-blocks. Taking FIG. 5 as an example, the defective inspection region image T1 will have an image feature vector $F^1=f_1^1, f_2^1, \ldots, f_{n1}^1$, wherein $n_1$ is the number of the training sub-blocks in the defective inspection region image T1. Similarly, the defective inspection region image T0 will have an image feature vector $F^0=f_1^0, f_2^0, \ldots, f_{n0}^0$, wherein $n_0$ is the number of the training sub-blocks in the image T0. Then, the training system may concatenate the image feature vectors with two scales together as a feature vector $F=\{F^0, F^1\}$ to be inputted to a classifier M.

After all the feature vectors corresponding to the N1+N2 training data to the classifier are being inputted, the training system starts to train the classifier M. Here, the classifier may be a support vector machines (SVM) classifier. Accordingly, the training system computes an optimal separating hyperplane of the SVM classifier as a basis for distinguishing whether the DUT T has the defect.

Figure 6:
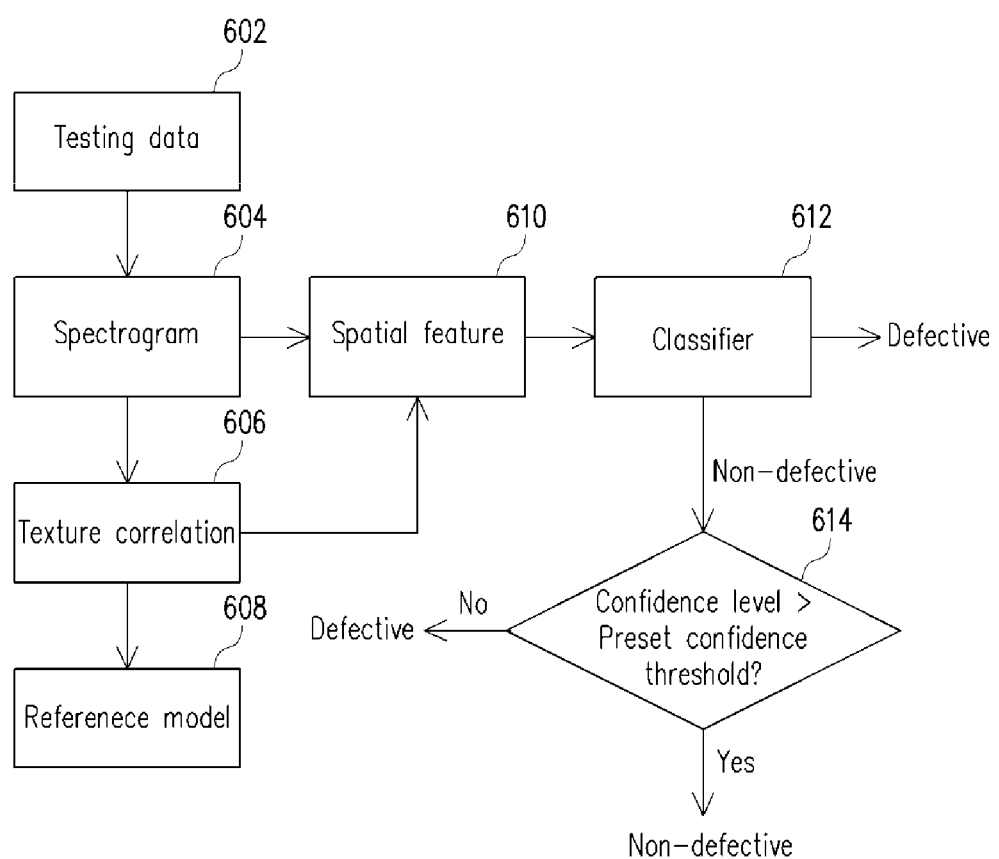
FIG. 6 is a functional block flowchart illustrating a method for vision-based defect detection according to an embodiment of the disclosure.

FIG. 6 is a functional block flowchart illustrating a method for vision-based defect detection according to an embodiment of the disclosure, and the flow of FIG. 6 is adapted to the defect detection system 100 of FIG. 1. Before the flow of FIG. 6 is performed, the processing device 140 pre-stores the reference model and the classifier mentioned by FIG. 5.

Referring to FIG. 1 and FIG. 6 together, first, as similar to step S206 and step S208, the processing device 140 obtains testing data 602 (i.e., the received audio signal corresponding to the DUT T), and converts the testing data to a spectrogram 604. Here, the testing data is the received audio signal in step S206.

Next, the processing device 140 obtains a plurality of sub-blocks associated with the spectrogram, and obtains a spatial feature 610 therefrom to be inputted to a classifier 612. In this embodiment, the processing device 140 also uses, for example, the preset frequency range of 3K to 15K Hz as the inspection region to generate an inspection region image. In an embodiment, the processing device 140 may directly segment the inspection region image to directly generate a plurality of sub-blocks of a same size. In another embodiment, the processing device 140 may perform image pyramid processing on the inspection region image to generate a plurality of inspection region images with different scales. Next, the processing device 140 segments the inspection region images with different scales to generate a plurality of sub-blocks of a same size.

Then, the processing device 140 obtains a feature value of each of the sub-blocks and obtains texture correlation 606 between each of the sub-blocks with respect to a reference model 608. Here, the feature value is, for example, at least one of a standard deviation and a Kurtosis of a plurality of pixel values of the sub-block, but needs to meet an input requirement of a pre-stored classifier. Here, the texture correlation may be a correlation coefficient of a local binary pattern between the sub-block and the reference sub-block corresponding to the reference model. Next, the processing device 140 then inputs the feature value and the texture correlation corresponding to each of the sub-blocks to the classifier 612 to generate an output result. This output result indicates whether the DUT T has the defect.

In this embodiment, in order to achieve a more rigorous detection and avoid the fact that the DUT T is being mistaken as non-defective, when the output result indicates that the DUT T does not have the defect, the processing device 140 may conduct a further confirmation according to reliability of the output result. In detail, taking the SVM classifier as an example, the processing device 140 can obtain a confidence level of the output result, and determine whether the confidence level is greater than a preset confidence threshold 614, wherein the preset confidence threshold may be 0.75. If true, the processing device 140 determines that the DUT T does not have the defect. Otherwise, the processing device 140 determines that the DUT T has the defect.

In this embodiment, the defect detected by the defect detection system 100 is the rub and buzz of the DUT T. Since different types of the rub and buzz generate resonance harmonics when a specific audio signal is played, the processing device 140 can further utilize a frequency and a harmonic frequency range of the rub and buzz in the spectrogram to identify a component in the DUT that causes the rub and buzz. From another perspective, the processing device 140 identifies the component in the DUT that causes the rub and buzz according to a specific region of the spectrogram.

Figure 7:
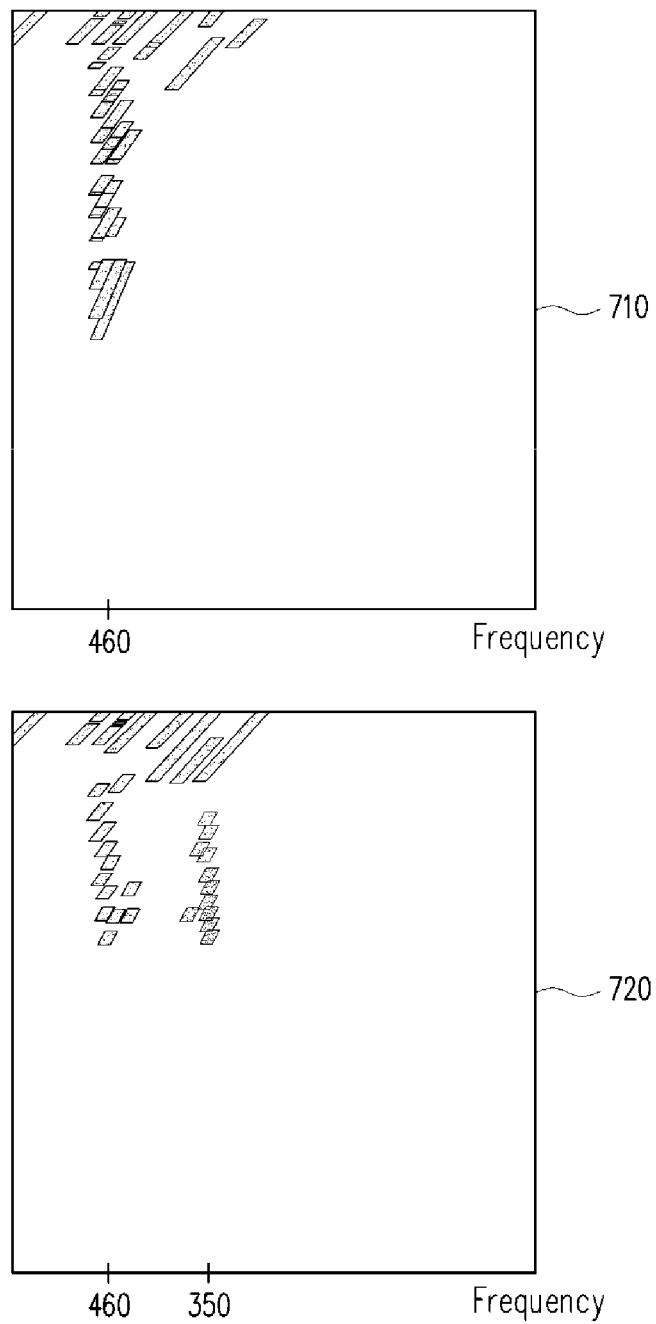
FIG. 7 is a schematic diagram illustrating a spectrogram according an embodiment of the disclosure.

For instance, FIG. 7 is a schematic diagram illustrating a spectrogram according an embodiment of the disclosure, and only some regions in the spectrogram are illustrated below. Both a spectrogram 710 and a spectrogram 720 have the rub and buzz. Since a resonance frequency point when a screw is not securely locked is a single point resonance of 460 Hz, the processing device 140 can derive from the spectrogram 710 that the screw of the DUT T is not securely locked. Since a resonance sound caused by iron filings in a speaker monomer resonates from 460 to 350 Hz, the processing device 140 can derive from the spectrogram 720 that there are iron filings in the DUT T.

Figure 8:
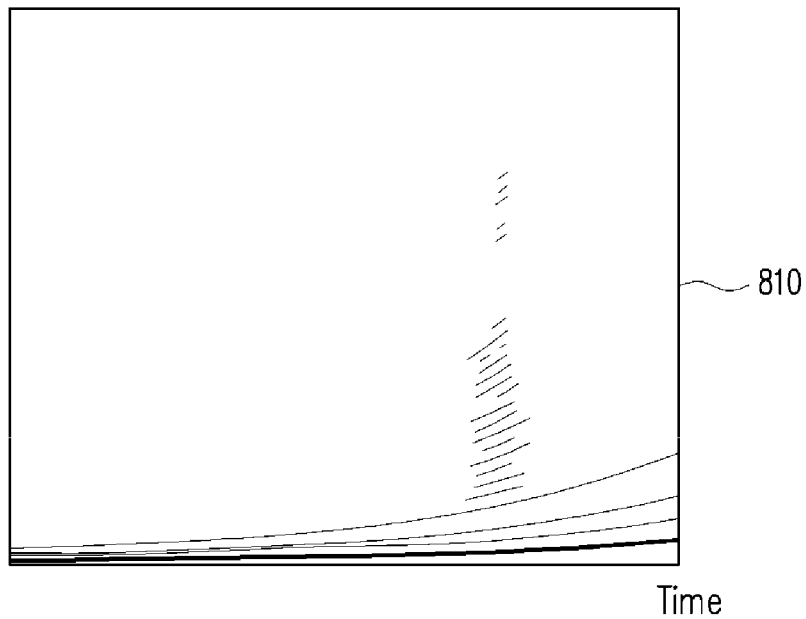
FIG. 8 illustrates a schematic diagram of a spectrogram with acceptable rub and buzz and a spectrogram with unacceptable rub and buzz.
Figure 8:
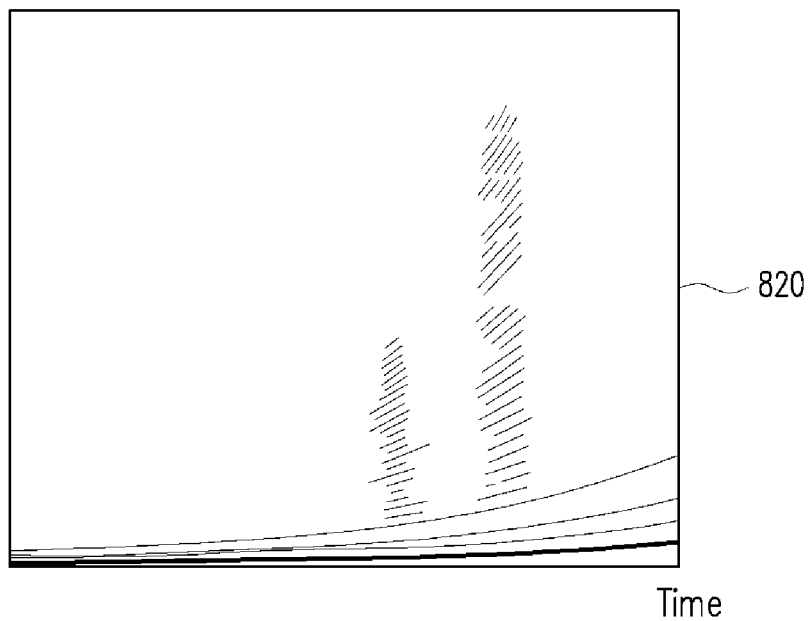

In practice, once a DUT is identified as defective due to rub and buzz, the testing operator would further determine whether the rub and buzz is acceptable or unacceptable based on its loudness to avoid overkill. If the rub and buzz is acceptable (e.g. little or not noticeable by human), the DUT would be considered as an "OK" DUT. If the rub and buzz is unacceptable, the DUT would be considered as an "NG" DUT. Visually speaking, FIG. 8 illustrates a schematic diagram of a spectrogram 810 with acceptable rub and buzz and a spectrogram 820 with unacceptable rub and buzz, where the spectrogram 820 includes notable clusters with high brightness level. From such observation, a machine learning-based quantification mechanism that classifies acceptable and unacceptable rub and buzz to reduce the overkill rate is introduced in the following embodiments.

Figure 9:
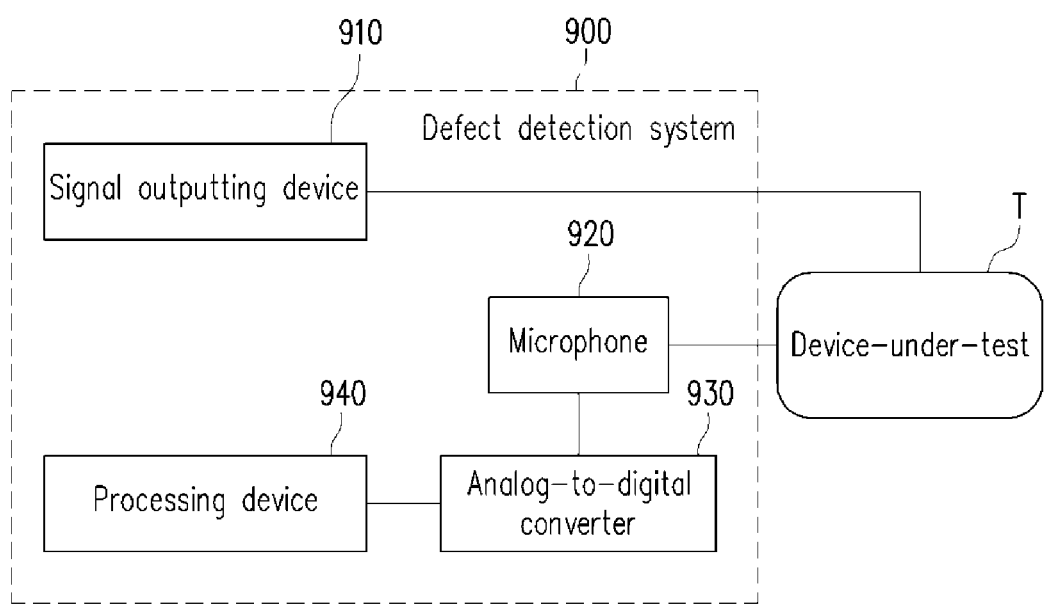
FIG. 9 illustrates a block diagram of a defect detection system according to an embodiment of the disclosure.

FIG. 9 illustrates a block diagram of a defect detection system according to an embodiment of the disclosure. It should, however, be noted that this is merely an illustrative example and the disclosure is not limited in this regard. All components of the defect detection system and their configurations are first introduced in FIG. 9. The functionalities of the components are disclosed in more detail in conjunction with FIG. 10.

Referring to FIG. 9, a defect detection system 900 includes a signal outputting device 910, a microphone 920, an analog-to-digital converter 930 and a processing device 940, where similar components to FIG. 1 are designated with similar numbers having a "9" prefix. The defect detection system 900 is configured to determine whether a DUT T has an unacceptable defect with respect to a predefined auditory standard. The predefined auditory standard may be a range set based on human auditory perception, a range customized for customer needs, a range specified by a third party, and so forth. Note that the following embodiment is also described by using an electronic device having a speaker as an example of the DUT T, and the defect to be detected by the defect detection system 900 is rub and buzz of the DUT T.

Figure 10:
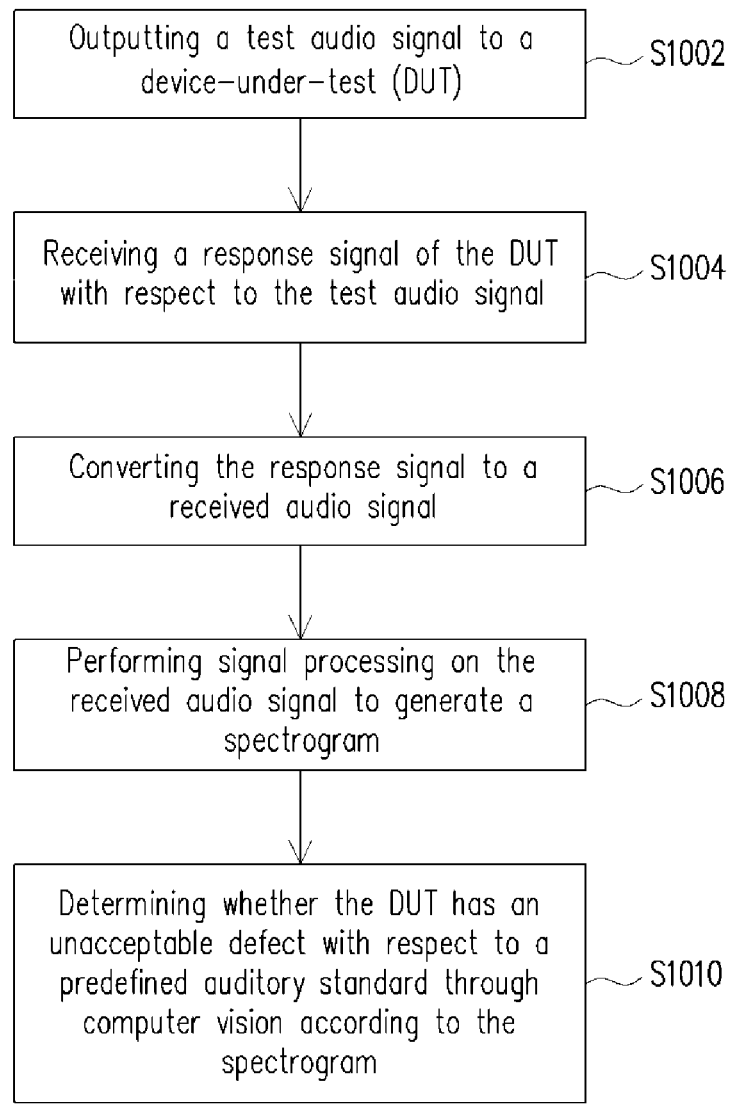
FIG. 10 illustrates a flowchart of a method for vision-based defect detection according to an embodiment of the disclosure.

FIG. 10 illustrates a flowchart of a method for vision-based defect detection according to an embodiment of the disclosure, and the flow of FIG. 10 is performed by the defect detection system 900 of FIG. 9.

Referring to FIG. 10 in conjunction with FIG. 9, the signal outputting device 910 outputs the test audio signal to the DUT T (step S1002), the microphone 920 receives a response signal of the DUT T with respect to the test audio signal (step S1004). The analog-to-digital converter 930 converts the response signal to a received audio signal (step S1006), and the processing device 940 performs signal processing on the received audio signal to generate a spectrogram (step S1008). Note that the details of steps S1002-S1008 may refer to related descriptions as presented previous in steps S202-S208 and would not be repeated herein for brevity's sake. Next, the processing device 940 determines whether the DUT T has an unacceptable defect with respect to a predefined auditory standard through computer vision according to the spectrogram (step S1010). In the present embodiment, the processing device 940 may first determine whether the DUT T has the defect according to the spectrogram, similar to step S208. If the determination is affirmative, the processing device 940 may further determine whether such defect is unacceptable with respect to the predefined auditory standard according to certain regions in the spectrogram to avoid overkill.

Accordingly, before the processing device 940 determines whether the DUT T has an unacceptable defect, another trained classifier is constructed. The classifier may be trained by the processing device 940, or may be a classifier trained by other processing devices. The disclosure is not limited in this regard. In the following embodiment, the construction of the classifier is performed by a device similar to the processing device 940 (hereinafter referred to as "a training system"). First, the training system collects a plurality of pieces of training data. The training data may be a plurality of training objects labeled as "acceptable defective" with respect to the predefined auditory standard. According to temporal and spatial features presented in a spectrogram of a DUT having rub and buzz, the training system would perform projection transformation and feature quantification on a spectrogram corresponding to each training audio samples.

Figure 11:
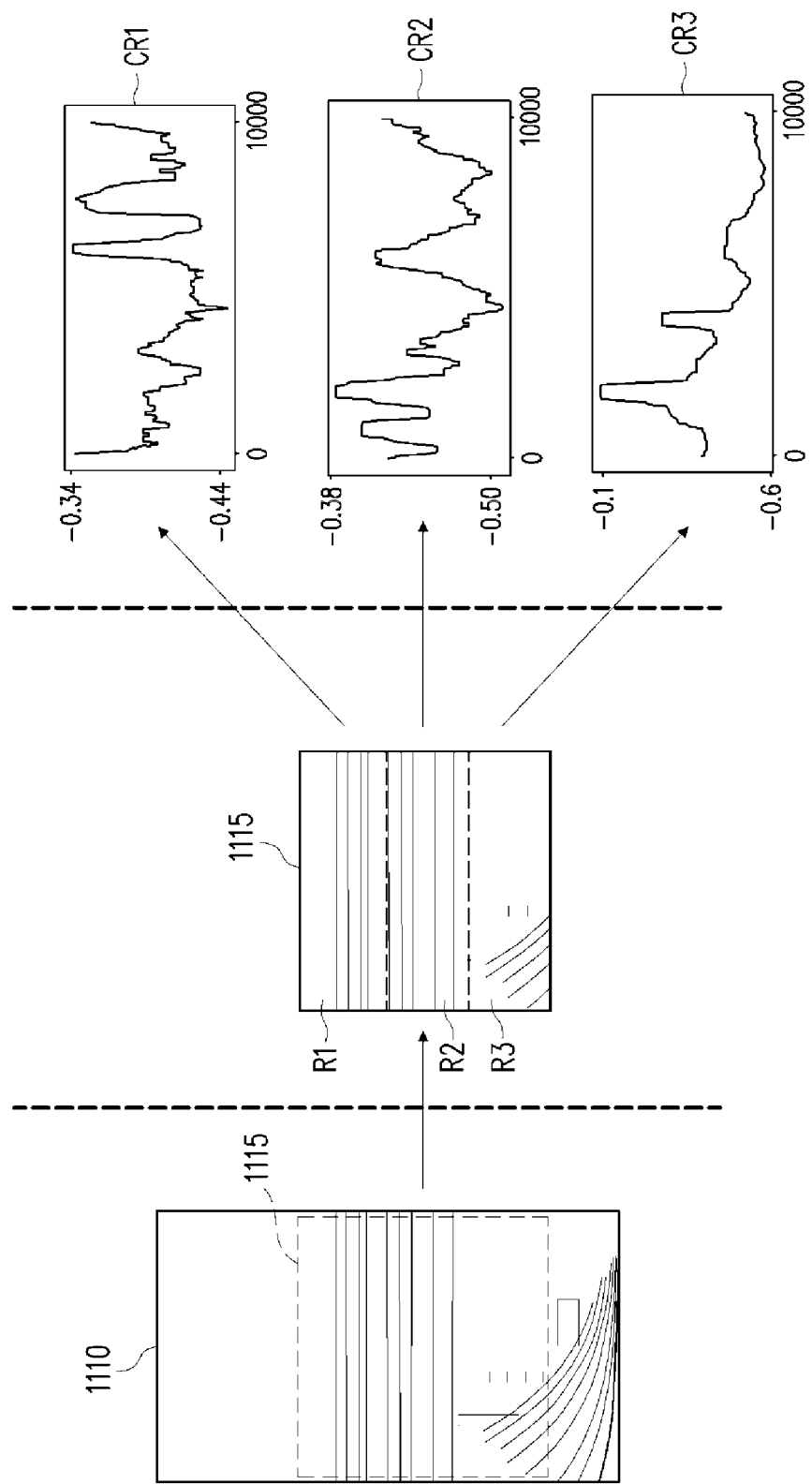
FIG. 11 illustrates a functional diagram of transforming a spectrogram to projection curves according to an embodiment of the disclosure.

FIG. 11 illustrates a functional diagram of transforming a spectrogram to projection curves according to an embodiment of the disclosure.

Referring to FIG. 11, the training system would extract an ROI 1115 from a spectrogram 1110, where the ROI 1115 may be a region that potentially represents rub and buzz as identified in, for example, FIG. 7 or a preset inspection region that rub and buzz may normally occur. Next, the training system would divide ROI spectrogram 115 into a plurality of sub-spectrograms (e.g. three regions R1-R3 in the present embodiment) with respect to different levels of frequencies (i.e. horizontal division). The training system would then transform the 2D sub-spectrograms R1-R3 to 1D projection curves CR1-CR3 respectively. As an example, the transformation may be done by averaging energy values at each time (i.e. in a vertical direction) in each of the sub-spectrograms R1-R3.

In terms of the projection curves CR1-CR3 where horizontal and vertical axes respectively represent time and energy, the projection values tend to be relatively higher for the sub-spectrogram having rub and buzz features. If the projection values are continuously high over time, it is highly possible that severe rub and buzz occurs. In addition, the rub and buzz features are further classified into unacceptable (severe) and acceptable rub and buzz features with respect to the predefined auditory standard. Assume that the predefined auditory standard is set based on the range within human auditory perception. The human ear is more sensitive to some frequencies than to others. For example, if features of rub and buzz only appear in the sub-spectrogram R1 (frequencies are all approximately larger than 10K), then such rub and buzz may possibly be acceptable. However, if features of rub and buzz appear in all the sub-spectrograms R1-R3, such rub and buzz may possibly be unacceptable. In other words, unacceptable (severe) rub and buzz would possess the following features: (1) larger projection energy, (2) long continuous time, and (3) broader frequency range coverage. Next, the training system would proceed to feature quantification.

Figure 12:
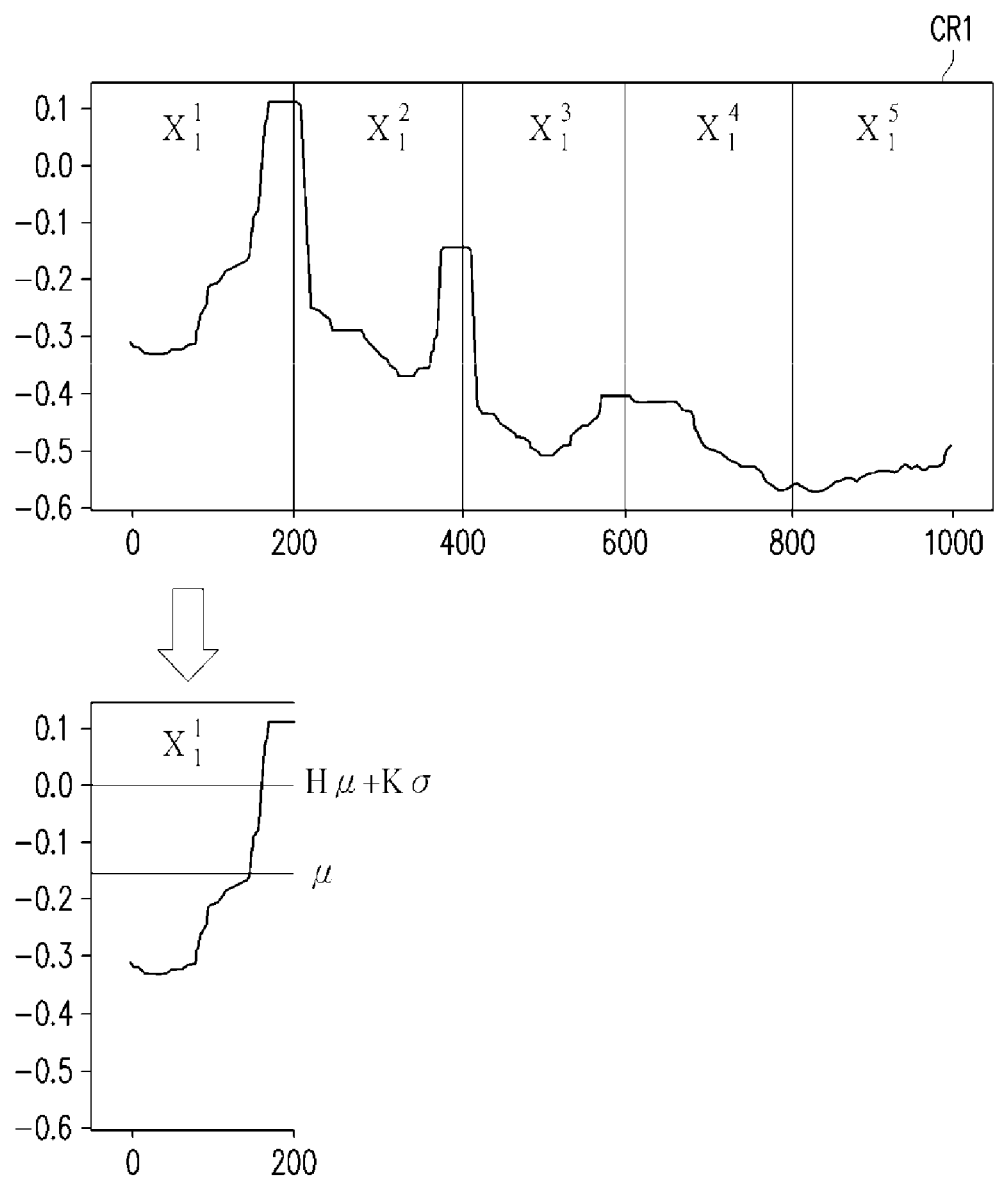
FIG. 12 illustrates a schematic diagram of dividing a projection curve according to an embodiment of the disclosure.

In detail, to make local features prominent, each projection curve is further divided into a plurality of segments with respect to different time intervals (i.e. vertical division). For example, the curve CR1 in FIG. 11 may be further divided into five segments $x_1^1$, $x_1^2$, $x_1^3$, $x_1^4$ and $x_1^5$ as illustrated in FIG. 12. Feature values for each segment $x_i^j$ corresponding to the $j^{th}$ segment in the $i^{th}$ region in the sub-spectrogram $x_i$ would involve computation of statistical parameters of data points in the corresponding segment and a weight designated to the corresponding sub-spectrogram based on, for example, Eq.(1):

$$v_i^j = \{HH_{mean}, HH_{size}/\text{length}(x_i^j), HL_{mean}, HL_{size}/\text{length}(x_i^j), w_i^j\} \quad (1)$$

$$z = \begin{cases} HH, & x_i^j \geq H_\mu + k\sigma \\ HL, & x_i^j < H_\mu + k\sigma \end{cases}$$

$$w_i^j = \exp\{-L \times (1 - HH_{mean})\}, w_i^j \in \{0, 1\}$$

Herein, $H_\mu$ denotes the average of values being greater than an average of all values $\mu = \text{mean}(x_i^j)$ in the segment $x_i^j$, and $k\sigma$ is greater than k times of the standard deviation of the corresponding segment $x_i^j$. $HH_{mean}$ and $HH_{mean}$ respectively denote the average of HH and HL, and $HH_{size}$ and $HL_{size}$ respectively denote the numbers of HH and HL. Note that HH and HL form a set of H that denotes the values being greater than an average of all values $\mu = \text{mean}(x_i^j)$ in the segment $x_i^j$. length($x_i^j$) denotes the number of data points in the segment $x_i^j$. $w_i^j$ denotes weights in different sub-spectrograms, and L denotes a coefficient of each sub-spectrogram. Note that the lower the frequencies in a sub-spectrogram, the lower the coefficient L, and the more the importance of rub and buzz in the corresponding interval.

To be more comprehensible, suppose that $x_i^j = \{0.5, 0.9, 0.1, 0.6, 0.2, 0.7\}$, then $\mu = 0.5$ and $H = \{0.5, 0.9, 0.6, 0.7\}$. Suppose that $k\sigma = 0$, then. $H_\mu = 0.675$. Suppose that $HH = \{0.9, 0.7\}$ and $HL = \{0.5, 0.6\}$, then $HH_{mean} = 0.8$, $HL_{mean} = 0.55$, $$\frac{HH_{size}}{\text{length}(x_i^j)} = \frac{2}{6} = 0.33 \text{ and } \frac{HL_{size}}{\text{length}(x_i^j)} = \frac{2}{6} = 0.33.$$

Suppose that the weight of the sub-spectrogram with low-frequencies L=−1, then $w_i^j = \exp\{-1 \times (1-0.8)\} = 0.818$. The feature quantification result of the segment $x_i^j$ is expressed as $v_i^j = \{0.8, 0.55, 0.33, 0.33, 0.818\}$.

Once the training system computes the feature quantification result $V = \{v_1, v_2, v_3\}$, $v_i = \{x_i^j, j=0, \ldots n\}$ for each sub-spectrogram of training objects with acceptable defects, a one-class SVM (OCSVM) classifier for identifying acceptable rub and buzz is constructed and trained based on machine learning/deep learning models as known per se. Then, the classifier would be able to distinguish between unacceptable and acceptable rub and buzz.

Revisiting FIG. 10, it should be understood that the detail steps for determining whether the DUT T has an unacceptable defect with respect to the predefined auditory standard through computer vision according to the spectrogram as described in step S1010 would correspond to the steps for training the OCSVM classifier. In detail, once the processing device 940 receives the spectrogram, it would extract an ROI spectrogram from the spectrogram, and divide the ROI spectrogram into multiple sub-spectrograms with respect to different levels of frequencies. Next, the processing device 940 would transform the sub-spectrograms to 1D projection curves respectively and divide the projection curves into multiple segments with respect to different time intervals. The processing device 940 would compute a feature quantification result for each of the sub-spectrogram and input the feature quantifications result into the OCSVM classifier. The processing device 940 would obtain a confidence level of the output result, and determine whether a buzz confidence level is greater than a preset confidence threshold, where the preset buzz confidence threshold may be 0. Note that the preset buzz confidence threshold may be adjustable based on actual applications. If the determination is affirmative, the processing device 940 would determine that the DUT T has acceptable rub and buzz. If the determination is negative, the processing device 140 determines that the DUT T has unacceptable rub and buzz.

Figure 13:
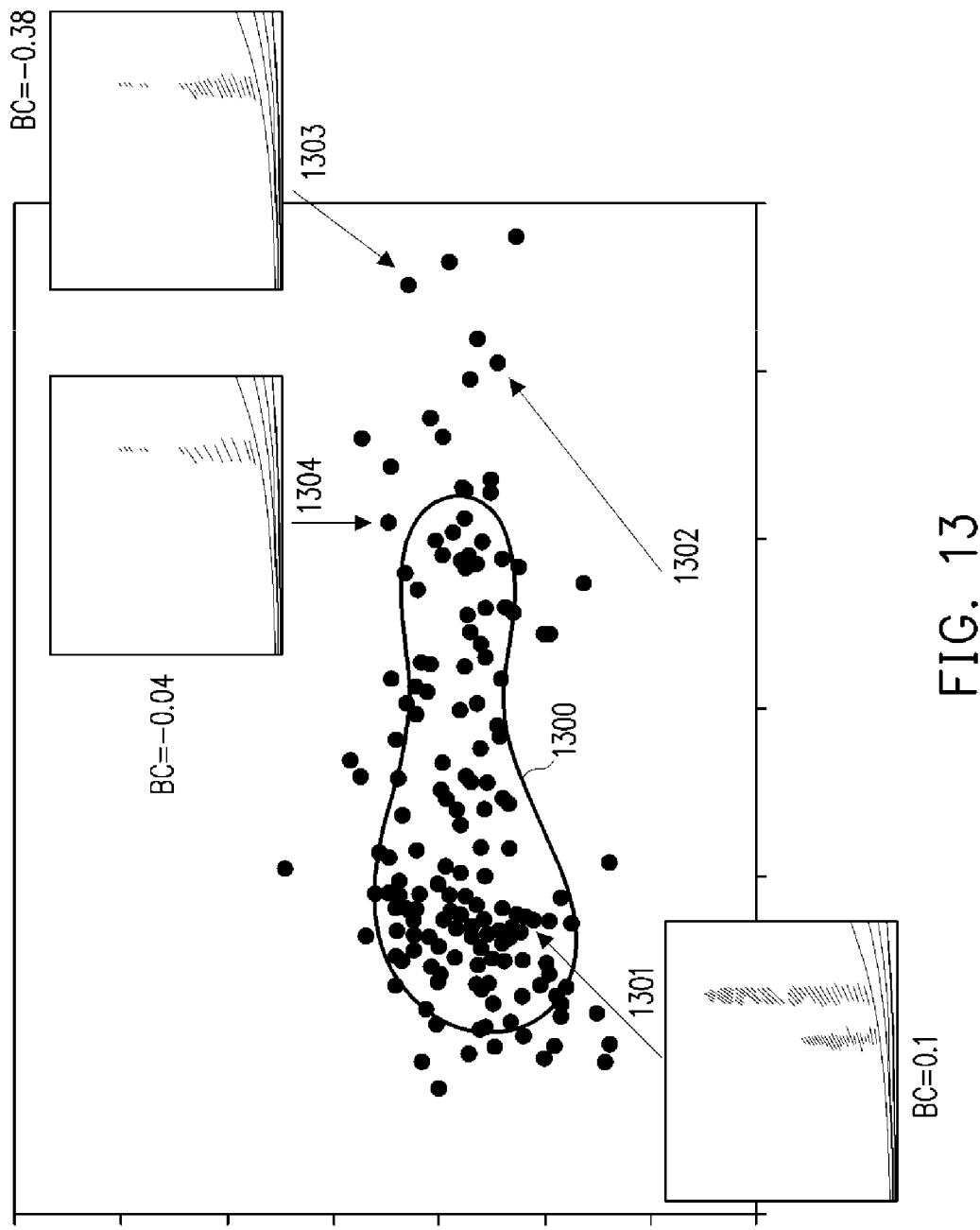
FIG. 13 illustrates a plot of rub and buzz level detections according to an embodiment of the disclosure.

For example, FIG. 13 illustrates a plot of rub and buzz level detections according to an embodiment of the disclosure, where each data point represents a DUT. A DUT corresponding to a point 1301 with a buzz confidence level being 0.1 has acceptable rub and buzz. In fact, DUTs corresponding to all points within a cluster 1300 have acceptable rub and buzz. DUTs corresponding to a point 1303 with a buzz confidence level being −0.38 and a point 1304 with a buzz confidence level being −0.04 have unacceptable rub and buzz. A DUT corresponding to a point 1302 being an outlier may be re-tested.

Table 1 summaries the results of experiments conducted using a method for vision-based defect detection without (e.g. FIG. 2) and with (e.g. FIG. 10) a machine learning-based quantification mechanism that classifies acceptable and unacceptable rub and buzz. In the approach without the quantification mechanism, given 1361 DUTs, 941 DUTs are classified as "OK" DUTs (OK rate=0.691) whereas 421 DUTs are classified as "NG" DUTs (NG rate=0.309). In the approach with the quantification mechanism, an extra rub and buzz classification is performed based on its severity with respect to a predefined auditory standard. For the 421 "NG" DUTs, 177 DUTs have acceptable rub and buzz (overall OK rate=0.821) whereas 244 DUTs have unacceptable rub and buzz (overall NG rate=0.179). Clearly, the findings reflected in Table 1 indicate that the approach with the quantification mechanism reduces 13% of overall NG rate. In terms of product manufacturing and management, inspection cost and retesting cost would be significantly reduced while product yield rate would be enhanced due to less overkill. In some applications, the NG DUTs may be further classified based on quality grades based on the severity of rub and buzz for future product marketing planning purposes.

TABLE 1

|  | OK Rate | NG Rate |
| --- | --- | --- |
| Defection detection with quantification mechanism | 0.691 | 0.309 |
| Defection detection without quantification mechanism | 0.821 | 0.179 |

In summary, the method and the system for vision-based defect detection proposed by the disclosure can detect whether DUT has an unacceptable defect with respect to a predefined auditory standard through computer vision according to the spectrogram. In this way, the disclosure can provide more accurate defect detection than subjective determination of the human ear, and thereby reduce related occupational injuries.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A method for vision-based defect detection of a device-under-test (DUT) comprising:
   outputting a test audio signal, wherein the test signal continuously ranges from a high frequency to a low frequency, over the passage of time;
   receiving a response signal that is generated with respect to the test audio signal;
   converting the received response signal to a received audio signal;
   performing signal processing on the received audio signal to generate a spectrogram;
   determining whether a defect exists by analyzing a distribution of signal strength, over a preset frequency range, according to the spectrogram;
   in response to determining that the DUT has the defect, determining whether the defect is unacceptable with respect to a predefined auditory standard through computer vision according to the spectrogram;
   wherein the step of determining whether the defect is unacceptable with respect to the predefined auditory standard through computer vision according to the spectrogram comprises:
   obtaining a plurality of sub-spectrograms associated with the spectrogram;
   transforming each of the sub-spectrograms into a projection curve;
   obtaining a plurality of segments associated with each of the projection curves;
   generating a feature quantification result corresponding to each of the segments of each of the projection curves; and
   determining whether the DUT has the unacceptable defect according to the feature quantification results and a classifier.

2. The method according to claim 1, wherein the step of receiving the response signal that is generated with respect to the test audio signal comprises:
   receiving the response signal by using a microphone; and
   performing analog-to-digital conversion on the response signal to generate the received audio signal.

3. The method according to claim 2, wherein the step of performing signal processing on the received audio signal to generate the spectrogram comprises:
   performing fast Fourier transform (FFT) on the received audio signal to generate the spectrogram.

4. The method according to claim 1, wherein the step of determining whether the defect exists by analyzing the distribution of signal strength according to the spectrogram comprises:
   determining whether the DUT has the defect through computer vision according to the spectrogram.

5. The method according to claim 1, wherein the step of obtaining the sub-spectrograms associated with the spectrogram comprises:
   extracting a region of interest (ROI) from the spectrogram, wherein the ROI corresponds to a preset frequency range; and
   dividing the ROI with respect to different levels of frequencies to generate the sub-spectrograms.

6. The method according to claim 1, wherein the step of transforming each of the sub-spectrograms into the projection curve comprises:
   averaging energy values at each time in each of the sub-spectrograms to generate the projection curve.

7. The method according to claim 1, wherein the step of obtaining the segments associated with each of the projection curves comprises:
   dividing each of the projection curves into the segments with respect to different time intervals.

8. The method according to claim 1, wherein the feature quantification result corresponding to each of the segments of each of the projection curves are associated with a plurality of statistical parameters of data points in the corresponding segment and a weight designated to the corresponding sub-spectrogram.

9. The method according to claim 1, wherein the step of determining whether the DUT has the unacceptable defect according to the feature quantification results and the classifier comprises:

inputting the feature quantification results corresponding to all of the segments of all of the projection curves into the classifier;

receiving an output result of the classifier; and determining whether the DUT has the unacceptable defect according to the output result of the classifier.

10. The method according to claim 9, wherein the classifier is a support vector machines (SVM) classifier that is constructed based on a plurality of defective training objects with acceptable defects with respect to the predefined auditory standard.

11. The method according to claim 9, wherein the step of determining whether the DUT has the unacceptable defect according to the output result of the classifier comprises:

obtaining a defect confidence level as the output result;

determining whether the defect confidence level is greater than a preset defect confidence threshold;

in response to the defect confidence level being greater than the preset defect confidence threshold, determining that the DUT has the acceptable defect; and in response to the defect confidence level not being greater than the preset defect confidence threshold, determining that the DUT has the unacceptable defect.

12. The method according to claim 1, wherein the DUT is an electronic device having a speaker.

13. The method according to claim 1, wherein the defect is rub and buzz of the DUT.

14. A defect detection system comprising:

a signal outputting device, configured to output a test audio signal, wherein the test signal continuously ranges from a high frequency to a low frequency, over the passage of time;

a microphone, configured to receive a response signal with respect to the test audio signal;

an analog-to-digital converter, configured to convert the response signal to a received audio signal; and a processing device, configured to perform signal processing on the received audio signal to generate a spectrogram and determine whether a device-under-test (DUT) has an unacceptable defect by analyzing a present frequency range with respect to the predefined auditory standard through computer vision according to the spectrogram;

wherein the processing device further pre-stores a classifier, and the processing device obtains a plurality of sub-spectrograms associated with the spectrogram, transforms each of the sub-spectrograms into a projection curve, obtains a plurality of segments associated with each of the projection curves, generates a feature quantification result corresponding to each of the segments of each of the projection curves, and determines whether the DUT has the unacceptable defect according to the feature quantification results and the classifier.

15. The system according to claim 14, wherein the processing device determines whether the DUT has a defect through computer vision according to the spectrogram and determines whether the defect is unacceptable with respect to the predefined auditory standard through computer vision according to the spectrogram in response to the determination that the DUT has the defect.

16. The system according to claim 14, wherein the DUT is an electronic device having a speaker.

17. The system according to claim 14, wherein the defect is rub and buzz of the DUT.

* * * * *